Dec. 26, 1967 T. L. HUNTER 3,359,620
WEATHERSTRIP REMOVING TOOL
Filed Oct. 4, 1965
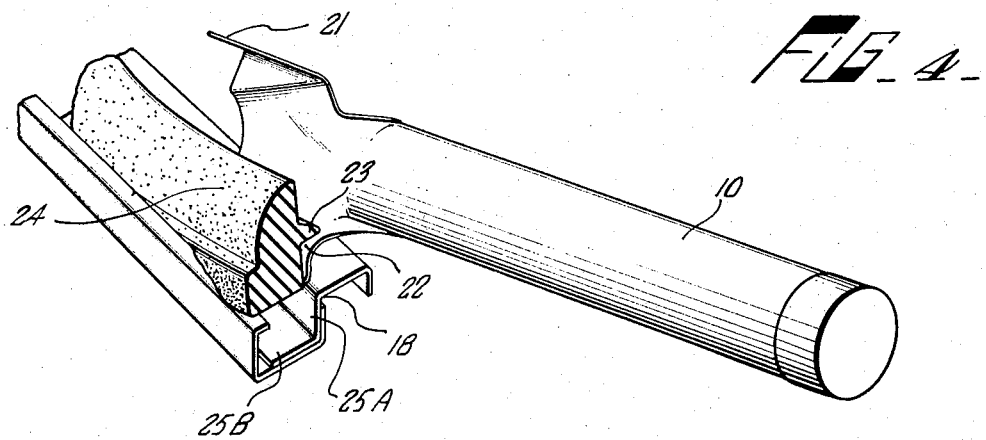
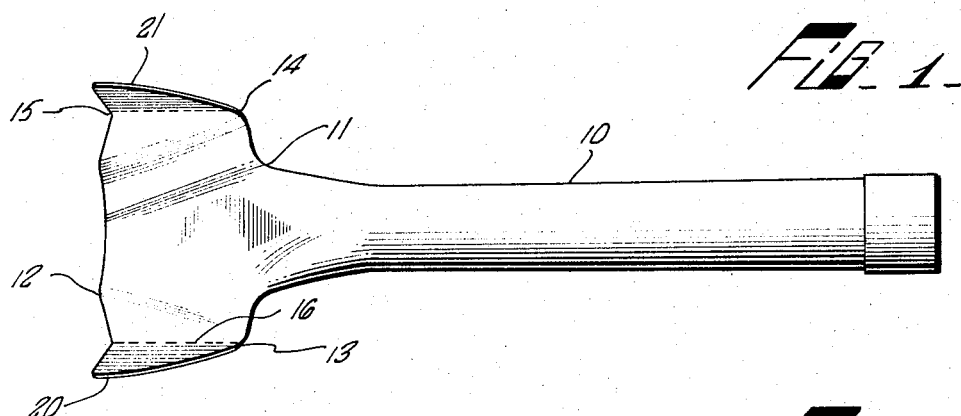
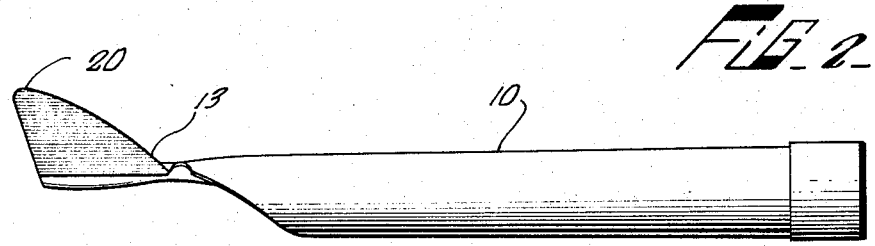
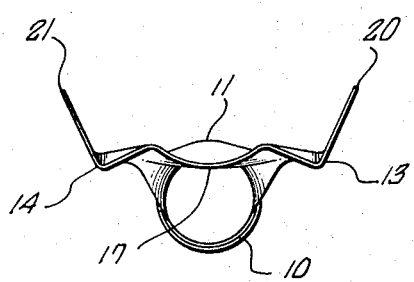
INVENTOR.
TRAVIS L. HUNTER
BY
ATTORNEYS.

United States Patent Office 3,359,620
Patented Dec. 26, 1967

3,359,620
WEATHERSTRIP REMOVING TOOL
Travis L. Hunter, 5002 Persimmon Ave.,
Temple City, Calif. 91780
Filed Oct. 4, 1965, Ser. No. 492,407
5 Claims. (Cl. 29—235)

ABSTRACT OF THE DISCLOSURE

A tool for removing resilient packing material from a channel of rectangular cross section, the tool having two rectangular cutting edges each designed to mate with the channel bottom and edge. The two rectangular cutting edges are provided by two blades positioned at opposite ends of a yoke which is affixed to a handle. Each blade has two surfaces which meet at a right angle to provide the rectangular cutting edge and one of these surfaces meets the yoke at an angle to form a trough wherein the edge of the channel may slidably fit as the tool is operatively moved along the length of the channel. Each blade is provided at its end with a sharp point to facilitate insertion of the tool between the channel and the material to be removed.

---

This invention relates to tools and, more particularly, relates to a tool for removing a continuous strip of resilient packing located in and bonded to a trough of non-resilient material.

Numerous articles of manufacture, automobiles in particular, include troughs, or channels, which serve to house a weathertight strip or seal of resilient material. These "weatherstrips" and their receiving channels are generally square or rectangular in cross-section. The stripping includes a lip which extends from and above the channel. This lip is compressed against a flange immediately adjacent to the channel when another non-yielding member is firmly seated on the exposed lip. Compression of the resilient lip forms a seal which for all practical purposes is weathertight and which serves to exclude rain, wind, and other elements.

Such resilient weatherstripping is often of relatively complex shape and is relatively expensive as it is formed from specially treated durable weather and corrosion resistant molded foam rubber or other similarly treated resilient materials. These complex shaped weather strips are often of considerable length because they are located in continuous closed loops around doors, air inlets and outlets, hoods, and trunk lids, to mention only a few possible locations in an automobile. These weatherstrips, when received in their channels are normally bonded by any suitable adhesive to the bottom and one side of the channel; the lip and remaining side generally being left unbounded to provide room for compression of the material when in use.

When it becomes necessary to remove such stripping, for example, to repair an automobile body, it is difficult to satisfactorily remove such strips without damaging them. In the past, artisans in the body working industry have employed screwdrivers or chisels to gouge and pry the weatherstripping from its bonded position. This technique is clumsy, time consuming and normally renders the otherwise re-usable weatherstripping useless for its re-application once the body working job is finished. Thus, added inconvenience and expense is involved because new stripping must be located and purchased in order to complete the repair job.

The foregoing disadvantages of the prior art are avoided by the principles of this invention in which a tool for removing weatherstripping from an elongated trough includes a bar having a handle at one end, a shank attached to said handle, the unattached end of said shank being joined to a cutting edge lying in a plane substantially transverse to the length of the shank and extending out from both sides thereof. This cutting edge conforms to the curvature of one edge and the bottom of the channel in which it is to be used. The outwardly extending portions of the cutting edges each include a right angle blade running the same direction as the handle for cutting through the bonding agent between the strip and the channel in which it is seated as the tool is moved longitudinally to the length of the channel.

The pair of right angle blades provide for cutting through the bonding agent in either direction as required for both right and left-handed artisans in the trade or as required for two operations to remove stripping which is glued to both edges of the channel as well as to the channel bottom. The pair of right angle blades in cross-section are joined in a W-shape with the upper portion of the middle apex of the W inverted and curved to provide an appropriately shaped yoke for slidably mating with the beveled edge of the channel. Additionally, each of the outermost points of the W-shaped section are sharpened to allow either right angle blade to be inserted between the channel and the seal by a slight twisting motion, thus avoiding any requirement that the seal be cut prior to its removal.

The foregoing and other features and principles of this invention may be more fully appreciated in connection with the accompanying drawing in which:

FIG. 1 is an elevational view of the tool of this invention;

FIG. 2 is a side view of FIG. 1;

FIG. 3 is a front view taken along the line 3—3 of FIG. 1; and

FIG. 4 is an overall general perspective showing the tool removing a weatherstrip from a channel.

Turning now to the drawing of FIG. 1, a handle 10 is shown fastened or extended by a shank into a transverse plane which extends outwardly from both sides of the shank 11. Shank 11 joins handle 10 to the curved cutting edge 12. Cutting edge 12 includes a pair of blades 13 and 14 which are formed by bending the extreme tags of the transverse plane along lines 15 and 16 at substantially right angles whereby a pair of sharp cutting edges each of which conform to the channel as described in more detail hereinafter, are provided.

The pair of right angle cutting blades 13 and 14 make the tool universal in its application, in that it may be used either by a right or left-handed person. The pair of blades 13 and 14 also can cut through bonding agent which holds weatherstripping in place on both sides and the bottom of the channel. These right angle cutting blades 13 and 14 are shown in more detail in FIGS. 2 and 3. As shown in FIG. 3 the cutting edge 12 is substantially W-shaped with the innermost apex of the W inverted and curved as shown by yoke 17. The curvature for yoke 17 which joins the two right angle blades 13 and 14 together is selected to match the beveled edge 18 of the channel when the tool is placed in operation as shown in FIG. 4.

Also shown in FIGS. 2 and 3 are two sharp points 20 and 21. These points are at the outer extremes of the W shape and provided a sharp tapered tip that is initially inserted underneath the lip 22 and bead 23 of the seal 24, FIG. 4, and moved fully into channel 25 by a slight clockwise or counter-clockwise twisting motion, by a right or left-handed user, respectively.

Thus, in operation the weatherstrip extraction tool is held by its handle 10 with its sharp tip 20 under the lip 22 and bead 23 of the weatherstrip to be removed, and in contact with the beveled edge 18 of channel 25. A slight clockwise twist allows for easy insertion of the right angle blade 13 along the downwardly extending portion 25A and bottom 25B of channel 25 as shown in FIG. 4. With the tool fully inserted in channel 25, the right angle cutting blade 13 mates with its right angle counterpart in channel 25. This counterpart in channel 25 is along the bottom and one side of channel 25.

Once the right angle cutting blade 13 is properly positioned in channel 25, the artisan moves the tool axially along the longitudinal axis of the channel whereby the bond between the weatherstrip material and the channel is positively and quickly cut through without any damage being done to the weatherstripping itself. The weatherstripping is thus easily removed and may be reused after the necessary repair has been accomplished.

It should be understood that this invention has been described in conjunction with an automobile body only for purpose of example. Numerous weatherstripping uses in the home, factories, boats, air conditioning, etc. are equally within the scope of this invention. Additionally, numerous modifications to this invention, it should be recognized, may be made by those skilled in the art without departing from the spirit and scope of this invention.

What is claimed is:

1. A tool for removing resilient weatherstripping material bonded to channels in automobile bodies and the like, comprising a metal bar having a handle at one end and a shank portion joining the handle to a curved double-winged cutting head substantially W-shaped in cross-section with the upper portion of the middle apex of the W inverted and curved to provide a yoke shaped as a mating surface for slidable contact with the beveled edge of a channel into which the tool is rotatably inserted between the resilient material and one channel edge and its bottom, the remaining portions of the W-shape comprising a pair of right angle blades sharpened for cutting the bonding agent along one side and the bottom of the channel when one of the pair of blades is inserted in place between the material and the channel for axial movement along the channel.

2. A weatherstrip removing tool in accordance with claim 1 wherein both blades of said pair are positioned at an acute angle with respect to the axis of the tool for enhancing movement of said resilient material out of said channel as said tool is moved axially along the channel.

3. A weatherstrip removing tool in accordance with claim 1 wherein both of said blades at the spot furthest away from said yoke terminate in a sharp point to enhance insertion of said tool between the resilient material and the channel by a twisting motion.

4. A tool for removing a molded resilient packing material bonded to a channel substantially rectangular in cross-section, comprising a shank handle having a yoke at one end thereof, the yoke having at least one substantially rectangular cutting edge provided by a right angle blade having two surfaces meeting at substantially a right angle, one of these surfaces joining the yoke at an angle sufficient to form a trough wherein an edge of the channel may slidably fit during operative axial movement of the tool along the longitudinal axis of the channel, the longitudinal axis of the trough positioned at an acute angle with the longitudinal axis of the handle, the other surface of the blade terminating in a sharp point for initial insertion of said point between an edge of the channel and said packing whereby a twisting movement of said handle inserts said right angle blade in a receiving right angle of said channel between said channel and said packing for axial movement therein to cut through the bond between the packing and channel.

5. A tool for removing a molded resilient packing material bonded to a channel having a substantially rectangular cross section comprising a handle having a yoke at one end thereof, the yoke including two blades positioned on opposite sides of the handle, each blade having a substantially rectangular cutting edge, each cutting edge provided by two surfaces meeting at substantially a right angle, one of said surfaces of each blade meeting the yoke at an angle sufficient to form a trough wherein an edge of the channel may slidably fit during operative axial movement of the tool along the longitudinal axis of the channel, the longitudinal axis of each trough being positioned at an acute angle with the longitudinal axis of the handle, the other surface of each blade terminating in a sharp point for initial insertion of either point between an edge of the channel and said packing whereby a twisting movement of the handle inserts one of the rectangular cutting edges into a receiving right angle of the channel between the channel and the packing for axial movement therein to cut through the bond between the packing and the channel.

References Cited

UNITED STATES PATENTS 1,790,014   1/1931   Mikitta _____ 30—294 X

WILLIAM FELDMAN, *Primary Examiner.*

J. C. PETERS, *Assistant Examiner.*